J. STURROCK.
GRAIN DRILL.
APPLICATION FILED AUG. 26, 1914.
1,262,283.
Patented Apr. 9, 1918.
2 SHEETS—SHEET 1.
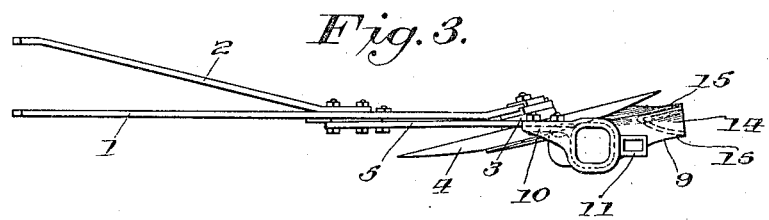
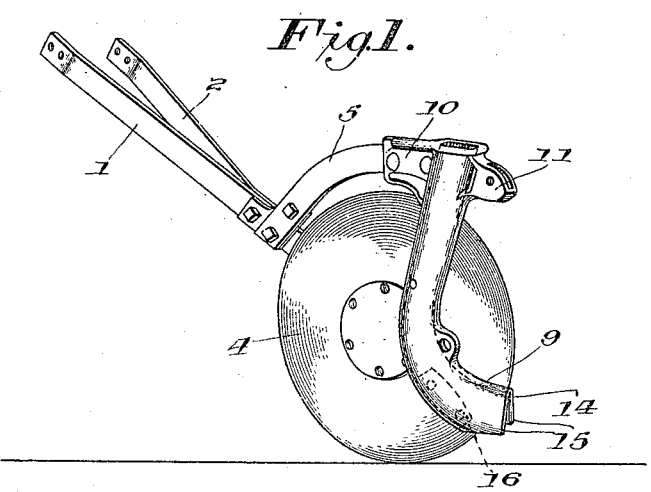
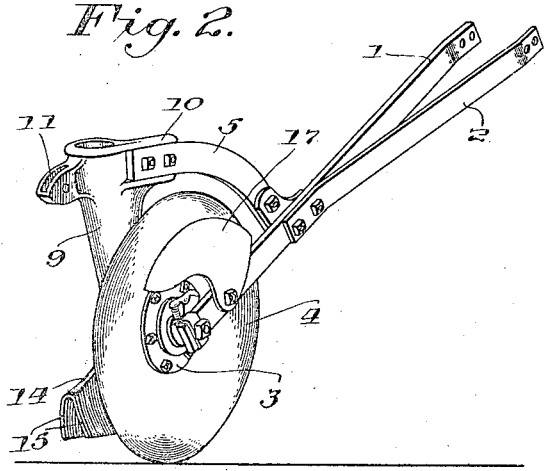
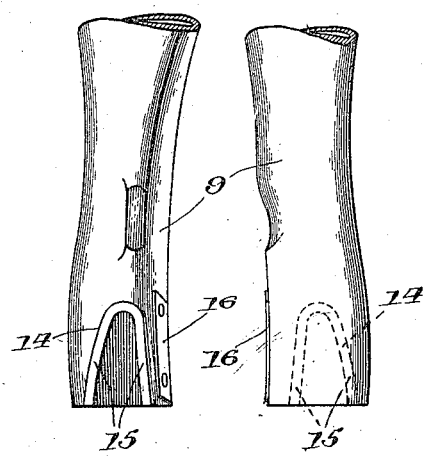
Witnesses:
C. C. Palmer
E. W. Burgess
Inventor:
John Sturrock,
By Chas. E. Lord
Atty.

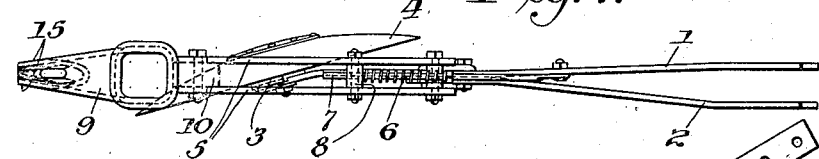
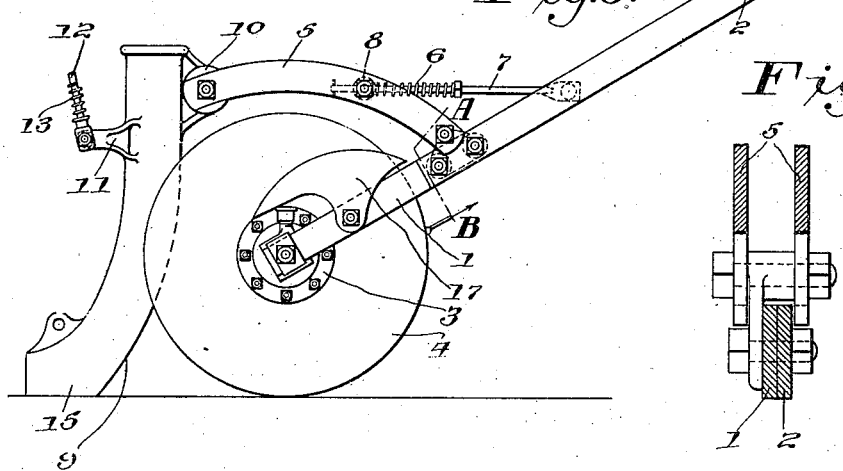
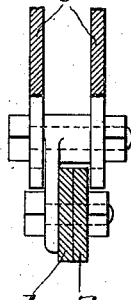
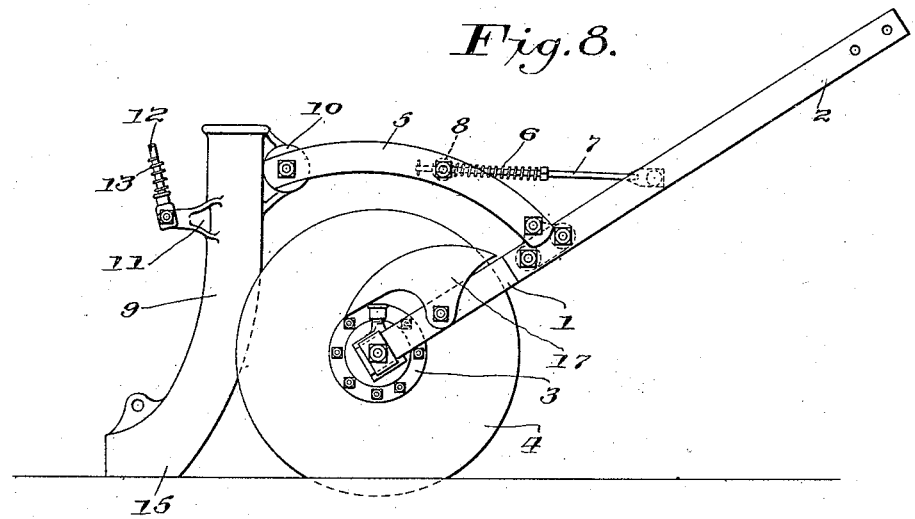

UNITED STATES PATENT OFFICE.

JOHN STURROCK, OF CHICAGO, ILLINOIS, ASSIGNOR TO INTERNATIONAL HARVESTER COMPANY OF NEW JERSEY, A CORPORATION OF NEW JERSEY.

GRAIN-DRILL.

1,262,283.  Specification of Letters Patent.  Patented Apr. 9, 1918.

Application filed August 26, 1914. Serial No. 858,593.

*To all whom it may concern:*

Be it known that I, JOHN STURROCK, a subject of the King of Great Britain, residing at Chicago, in the county of Cook and State of Illinois, have invented certain new and useful Improvements in Grain-Drills, of which the following is a full, clear, and exact specification.

My invention relates to grain drills of the single disk type, wherein the furrow openers include independent drag bars having their front ends pivotally connected with the frame of the machine in a manner permitting their rear ends to rise and fall, a rotatable disk journaled upon a support carried by the drag bar, a grain delivery boot also supported by the drag bar, and a scraper mechanism engaging with the disk to keep it clean of adhering soil.

My invention has among its objects to provide an improved form of grain boot and boot support, and an efficient form of scraper mechanism.

These objects are attained by means of mechanism, one embodiment of which is illustrated in the accompanying drawings, in which—

Figure 1 is a side elevation in perspective of the grain boot, furrow opening disk, and their supporting drag bar;

Fig. 2 is a view similar to Fig. 1, as seen from its opposite side;

Fig. 3 is a top plan view of Fig. 1;

Fig. 4 is a rear elevation of part of the grain boot;

Fig. 5 is a front elevation of Fig. 4;

Fig. 6 is a side elevation of the grain boot, disk furrow opener and drag bar support, showing the yielding connection between the boot and drag bar;

Fig. 7 is a top plan view of Fig. 6;

Fig. 8 is a view similar to Fig. 6, showing the grain boot as swung upward and rearward about its pivotal connection with the drag bar; and Fig. 9 is a cross section of Fig. 6 along line A—B.

Referring to the drawings, wherein the same reference numerals designate like parts throughout the several views, the main part of the drag bar connection is represented by 1. 2 represents a brace member having its rear end secured to the main bar intermediate its ends, the two members diverging at their front ends and provided with means whereby they may be pivotally connected with the frame of the machine in a manner permitting their rear ends to rise and fall in a vertical plane. 3 represents a disk support secured to the rear end of the drag bar member 1, and having a concavo-convex rotatable furrow opening disk 4 journaled thereon, disposed at an angle with the line of draft, and having its concave face adjacent the drag bar, and 5 a boot supporting arm including upwardly and rearwardly curved bars substantially concentric with the axis of the disk, and spaced apart, having their front ends either rigidly secured to the drag bar, as shown in Fig. 1, or pivotally connected therewith, as shown in Figs. 6 and 9, wherein a compression spring 6 is carried by a link 7, having its rear end pivotally connected with the drag bar and its front end slidably received by a block member 8 mounted between the bars 5 intermediate their ends, the spring being operative to resist an upward swing of the bars 5 about their pivotal connections with the drag bar. 9 represents a grain conducting boot having its upper end provided with a forwardly extending ear member 10 whereby it is secured to the rear ends of the curved bars 5, and a rearwardly extending ear member 11 whereby it is connected with the usual controlling links 12, carrying pressure springs 13. The boot 9 is disposed upon the convex side of the furrow opening disk, being curved as shown in Fig. 4, to conform therewith, and curved gradually downward and rearward, terminating in a substantially horizontal lower end 14, open at its bottom and rear end and having rearwardly diverging side walls 15, forming a V-shaped seed conduit substantially horizontal, that follows in the furrow opened by the rotatable disk, keeping it from becoming filled until the seed has been discharged from the delivery opening of the boot therein unobstructed, and 16 represents a short steel wearing plate secured to the inner wall of the lower end of the boot and adapted to engage with the adjacent moving disk in a manner to both support the journal bearing of the disk and to keep it cleared of adhering soil that might otherwise collect thereon. 17 represents a scraper secured to the drag bar forwardly of the axis of the disk and extending upwardly therefrom. The scraper has its upper end curved laterally in a manner to fit closely against the concave surface of the disk and longitudinally to present gradually increasing radii, the form being such as to shed roots and other trash that might otherwise collect thereon.

Having shown a preferred and modified form of my invention, I do not wish to confine it closely to the specific details of construction as shown, it being understood that changes may be made in form and proportions without departing from the spirit of the invention.

What I claim as my invention, and desire to secure by Letters Patent, is:

1. In a furrow opener for grain drills, a rotatable concavo-convex furrow opening disk, and a boot supported adjacent the convex surface thereof and curved throughout its length to conform therewith, said boot curving downward and rearward and terminating in a substantially horizontal part disposed in the direction of the line of travel and being open at its bottom and rear end.

2. In a furrow opener for grain drills, a rotatable concavo-convex furrow opening disk, a boot supported adjacent the convex surface thereof and curved throughout its length to conform therewith, said boot curving downward and rearward and terminating in a substantially horizontal part disposed in the direction of the line of travel, open at its bottom and rear end, and a wearing plate secured to the inner side of its lower end and engaging with said disk.

3. In a furrow opener for grain drills, a rotatable concavo-convex furrow opening disk, a boot supported adjacent the convex surface thereof and curved throughout its length to conform therewith, said boot curving downward and rearward and terminating in a substantially horizontal part disposed in the direction of the line of travel, open at its bottom and rear end, having its side walls diverging rearwardly and a wearing plate secured to its inner wall and engaging with said disk.

4. In a furrow opener for grain drills, a drag bar, a disk support carried by said drag bar, a rotatable furrow opening disk journaled upon said support, a boot, a support for said boot including an arm having its rear end secured to said boot and curving forward and downward substantially concentric with the axis of said disk, having its front end pivotally connected with said drag bar, and a spring operative between said drag bar and arm and yieldingly resisting an upward swing of the rear end of said arm.

5. In a furrow opener for grain drills, a drag bar, a disk support carried by said drag bar, a rotatable furrow opening disk journaled upon said support, a boot, a support for said boot including an arm having its rear end secured to said boot and curving forward and downward substantially concentric with the axis of said disk, having its front end pivotally connected with said drag bar, a link having its front end pivotally connected with said drag bar and its rear end slidable with said arm, and a compression spring carried by said link and operative to yieldingly resist an upward swing of the rear end of said arm.

In testimony whereof I affix my signature in the presence of two witnesses.

JOHN STURROCK.

Witnesses:
C. H. BURNS,
WILLIAM CLARK.

Copies of this patent may be obtained for five cents each, by addressing the "Commissioner of Patents, Washington, D. C."